United States Patent
Wang et al.

(10) Patent No.: US 11,200,416 B2
(45) Date of Patent: Dec. 14, 2021

(54) METHODS AND APPARATUSES FOR IMAGE DETECTION, ELECTRONIC DEVICES AND STORAGE MEDIA

(71) Applicant: BEIJING SENSETIME TECHNOLOGY DEVELOPMENT CO., LTD, Beijing (CN)

(72) Inventors: Zhe Wang, Beijing (CN); Jianping Shi, Beijing (CN); Hongsheng Li, Beijing (CN); Xiaogang Wang, Beijing (CN)

(73) Assignee: BEIJING SENSETIME TECHNOLOGY DEVELOPMENT CO., LTD, Beijing (CN)

( * ) Notice: Subject to any disclaimer, the term of this patent is extended or adjusted under 35 U.S.C. 154(b) by 173 days.

(21) Appl. No.: 16/457,317

(22) Filed: Jun. 28, 2019

(65) Prior Publication Data
US 2019/0325215 A1 Oct. 24, 2019

Related U.S. Application Data

(63) Continuation of application No. PCT/CN2018/090680, filed on Jun. 11, 2018.

(30) Foreign Application Priority Data

Jun. 14, 2017 (CN) .................. 201710448251.X

(51) Int. Cl.
*G06K 9/00* (2006.01)
*G06F 17/18* (2006.01)
(Continued)

(52) U.S. Cl.
CPC ......... *G06K 9/00536* (2013.01); *G06F 17/18* (2013.01); *G06K 9/00523* (2013.01);
(Continued)

(58) Field of Classification Search
CPC .......... G06K 9/00536; G06K 9/00523; G06K 9/623; G06K 9/6273; G06K 9/00617;
(Continued)

(56) References Cited

U.S. PATENT DOCUMENTS 5,742,710 A * 4/1998 Hsu .................. G06T 7/238
382/236
8,848,068 B2 9/2014 Pfister
(Continued)

FOREIGN PATENT DOCUMENTS

CN 104036276 A 9/2014
CN 106127263 A 11/2016
(Continued)

OTHER PUBLICATIONS

Hu et al., CN106127263A, Google English Translation, Original Document Published on Nov. 16, 2016 (Year: 2016).*
(Continued)

*Primary Examiner* — Aaron W Carter
(74) *Attorney, Agent, or Firm* — Syncoda LLC; Feng Ma

(57) ABSTRACT

Image detection methods and apparatuses, electronic devices and storage media include: down-sampling a second image to obtain a first image; determining at least one key sub-region in the second image for category detection; respectively extracting a feature of the first image and a feature of the at least one key sub-region; and generating a category detection result of the second image at least based on the extracted features.

19 Claims, 8 Drawing Sheets

(51) Int. Cl.
*G06K 9/62* (2006.01)
*G06T 3/40* (2006.01)
*G06T 7/00* (2017.01)

(52) U.S. Cl.
CPC ............... *G06K 9/623* (2013.01); *G06T 3/40* (2013.01); *G06T 7/0014* (2013.01); *G06T 2207/20084* (2013.01)

(58) Field of Classification Search
CPC ......... G06F 17/18; G06T 3/40; G06T 7/0014; G06T 2207/20084; G06T 2207/20016; G06T 2207/20021; G06T 2207/20081; G06T 2207/30041; G06T 7/0012
See application file for complete search history.

(56) References Cited

U.S. PATENT DOCUMENTS

| | | | |
|---|---|---|---|
| 10,573,003 B2* | 2/2020 | Sethi | G06K 9/6273 |
| 10,853,449 B1* | 12/2020 | Nguyen | G06F 19/321 |
| 2013/0300900 A1 | 11/2013 | Pfister | |
| 2015/0169638 A1* | 6/2015 | Jaber | G06F 16/5854 707/749 |
| 2015/0278224 A1* | 10/2015 | Jaber | G06F 16/5854 707/749 |
| 2017/0004353 A1* | 1/2017 | Tang | G06K 9/6232 |
| 2017/0337682 A1* | 11/2017 | Liao | G06T 7/30 |
| 2018/0314691 A1* | 11/2018 | Mori | G16H 50/20 |
| 2019/0139216 A1* | 5/2019 | Georgescu | G06T 7/11 |
| 2019/0156144 A1* | 5/2019 | Li | G06K 9/3233 |
| 2019/0325215 A1* | 10/2019 | Wang | G06T 7/0014 |
| 2019/0378291 A1* | 12/2019 | Etcheverry | G06T 3/40 |
| 2020/0194108 A1* | 6/2020 | Podilchuk | A61B 8/5223 |
| 2020/0250491 A1* | 8/2020 | Peng | G06K 9/00617 |

FOREIGN PATENT DOCUMENTS

| | | | |
|---|---|---|---|
| CN | 106845507 A | 6/2017 | |
| CN | 108230294 A * | 6/2018 | ......... G06K 9/00617 |

OTHER PUBLICATIONS

Wang et al., CN108230294, Google English Translation, Original Document Published on Jun. 29, 2018 (Year: 2018).*
International Search Report in the international application No. PCT/CN2018/090680, dated Sep. 18, 2018.
Abra'moff, M.D., Reinhardt, J.M., Russell, S.R., Folk, J.C., Mahajan, V.B., Niemeijer, M., Quellec, G.: Automated early detection of diabetic retinopathy. Ophthalmology (2010).
Chaum, E., Karnowski, T.P., Govindasamy, V.P., Abdelrahman, M., Tobin, K.W.: Automated Diagnosis of Retinopathy by Content Based Image Retrievala. (2008).
Abra'moff, M.D., Lou, Y., Erginay, A., Clarida, W., Amelon, R., Folk, J.C., Niemeijer, M.: Improved automated detection of diabetic retinopathy on a publicly available dataset through integration of deep learning deep learning detection of diabetic retinopathy. IOVS (2016).
Chandrakumar, T., Kathirvel, R.: Classifying diabetic retinopathy using deep learning architecture. In: IJERT (2016).
Gulshan, V., Peng, L., Coram, M., Stumpe, M.C., Wu, D., Narayanaswamy, A., Venugopalan, S., Widner, K., Madams, T., Cuadros, J., et al.: Development and validation of a deep learning algorithm for detection of diabetic retinopathy in retinal fundus photographs. JAMA (2016).
Jamaludin, A., Kadir, T., Zisserman, A.: Spinenet: Automatically pinpointing classification evidence in spinal MRIs. In: MICCAI (2016).
Zhe Wang, Yanxin Yin, Jianping Shi, Wei Fang, Hongsheng Li and Xiaogang Wang: Zoom-in-Net: Deep Mining Lesions for Diabetic Retinopathy Detection.
First Office Action of the Chinese application No. 201710448251.X, dated Jun. 14, 2019.

* cited by examiner

METHODS AND APPARATUSES FOR IMAGE DETECTION, ELECTRONIC DEVICES AND STORAGE MEDIA

CROSS-REFERENCE TO RELATED APPLICATIONS

This is a continuation of International patent application No. PCT/CN2018/090680 filed on Jun. 11, 2018, which claims priority to Chinese Patent Application No. 201710448251.X, filed on Jun. 14, 2017. The disclosures of these applications are incorporated herein by reference in their entirety.

TECHNICAL FIELD

Embodiments of the present application relate to the field of computer vision technologies, and in particular, to methods and apparatuses for detecting an image category, methods and apparatuses for detecting a medical image, electronic devices and storage medium.

BACKGROUND

In recent years, with the popularization and development of computer vision technologies, detecting lesion regions in medical images with computers can provide meaningful diagnostic advice for doctors and patients. For example, diabetic retinopathy is an eye disease caused by diabetes, and is one of the main causes of blindness in working-age people. If it is treated at an early stage, the patient's visual deterioration can be effectively slowed down or even stopped. However, diabetic retinopathy has no early symptoms, and the diagnostic process requires the optometrist to spend a lot of time examining the fundus retina picture. As a result, effective treatment is generally carried out slowly. In order to reduce the workload of doctors, algorithms using image analysis for diagnosis have been proposed in recent years.

SUMMARY

Embodiments of the present application provide the technical solutions of image detection.

According to one aspect of the embodiments of the present application, provided is a method for detecting an image category, including: down-sampling a second image to obtain a first image; determining at least one key sub-region in the second image relative to category detection; respectively extracting a feature of the first image and a feature of the at least one key sub-region; and generating a category detection result of the second image at least based on the extracted feature of the first image and feature of the at least one key sub-region.

According to another aspect of the embodiments of the present application, provided is a method for detecting a medical image, including: down-sampling a second medical image to obtain a first medical image; determining at least one key sub-region in the second medical image relative to predetermined disease level detection; respectively extracting a feature of the first medical image and a feature of the at least one key sub-region; and generating a disease diagnosis result of the second medical image at least based on the extracted feature of the medical image and feature of the at least one key sub-region.

According to still another aspect of the embodiments of the present application, provided is an apparatus for detecting an image category, including: a down-sampling module configured to down-sample a second image to obtain a first image; a determining module configured to determine at least one key sub-region in the second image relative to category detection; an extracting module configured to respectively extract a feature of the first image and a feature of the at least one key sub-region; and a generating module configured to generate a category detection result of the second image at least based on the extracted feature of the first image and feature of the at least one key sub-region.

According to yet another aspect of the embodiments of the present application, provided is an apparatus for detecting a medical image, including: a down-sampling module configured to down-sample a second medical image to obtain a first medical image; a determining module configured to determine at least one key sub-region in the second medical image relative to predetermined disease level detection; an extracting module configured to respectively extract a feature of the first medical image and a feature of the at least one key sub-region; and a generating module configured to generate a disease diagnosis result of the second medical image at least based on the extracted feature of the first image and feature of the at least one key sub-region.

According to yet another aspect of the embodiments of the present application, provided is an electronic device, including a processor and a memory, where the memory is configured to store at least one executable instruction which enables the processor to execute operations corresponding to the method for detecting an image category detection according to any one of the foregoing embodiments of the present application.

According to yet another aspect of the embodiments of the present application, provided is an electronic device, including a processor and a memory, where the memory is configured to store at least one executable instruction which enables the processor to execute operations corresponding to the method for detecting a medical image according to any one of the foregoing embodiments of the present application.

According to yet another aspect of the embodiments of the present application, provided is a noon-transitory computer readable storage medium for storing a computer readable instruction, where the instruction is executed to achieve operations of the method for detecting an image category according to any one of the foregoing embodiments of the present application.

According to yet another aspect of the embodiments of the present application, provided is a non-transitory computer readable storage medium for storing a computer readable instruction, where the computer readable instruction, when being executed, causes a processor to perform the operations in the method for detecting a medical image according to any one of the foregoing embodiments of the present application.

According to yet another aspect of the embodiments of the present application, provided is a computer program, including a computer readable code, where the computer readable code, when running in a device, causes a processor in the device to execute instructions for implementing steps in the method for detecting an image category according to any one of the foregoing embodiments of the present application.

According to yet another aspect of the embodiments of the present application, provided is a computer program, including a computer readable code, where the computer readable code, when running in a device, causes a processor in the device to execute instructions for implementing steps in the method for detecting a medical image according to any one of the foregoing embodiments of the present application.

According to yet another aspect of the embodiments of the present application, provided is an apparatus for detecting an image category, including: a processor; and a memory for storing instructions executable by the processor; wherein the processor is configured to: down-sample a second image to obtain a first image; determine at least one key sub-region in the second image relative to category detection; respectively extract a feature of the first image and a feature of the at least one key sub-region; and generate a category detection result of the second image at least based on the extracted feature of the first image and feature of the at least one key sub-region.

The following further describes in detail the technical solutions of the present application with reference to the accompanying drawings and embodiments.

BRIEF DESCRIPTION OF THE DRAWINGS

The accompanying drawings constituting a part of the specification describe embodiments of the present application and are intended to explain the principles of the present application together with the descriptions.

According to the following detailed descriptions, the present application can be understood more clearly with reference to the accompanying drawings.

DETAILED DESCRIPTION

Figure 1:
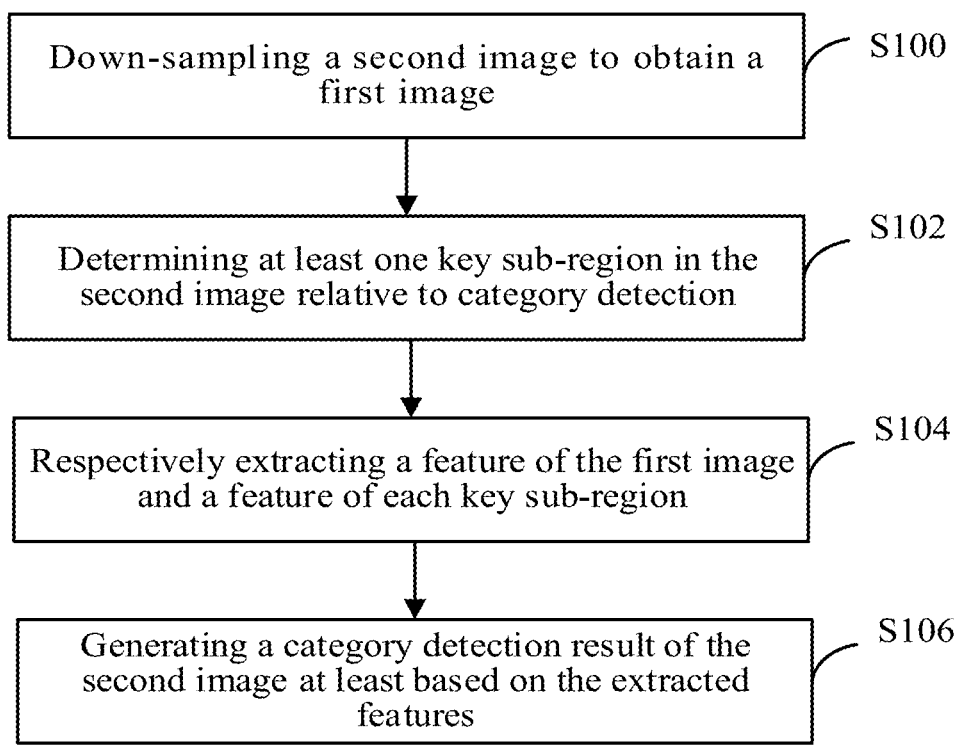
FIG. 1 is a flowchart of a method for detecting an image category according to one embodiment of the present application.

The following further describes in detail some possible implementations of embodiments of the present application by combining the accompanying drawing (the same reference numerals in several accompanying drawings represent the same elements) and embodiments. The following embodiments are intended to describe the present application, rather than limiting the scope of the present application.

A person skilled in the art may understand that the terms such as "first" and "second" in the embodiments of the present application are only used to distinguish different steps, devices or modules, etc., and do not represent any specific technical meaning or an inevitable logical sequence therebetween.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present application may be applied to electronic devices such as terminal devices, computer systems, and servers, which may operate with numerous other general-purpose or special-purpose computing system environments or configurations. Examples of well-known terminal devices, computing systems, environments, and/or configurations suitable for use together with the electronic devices such as the terminal devices, computer systems, and servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like.

The electronic devices such as the terminal device, computer systems, and servers may be described in the general context of computer system executable instructions (for example, program modules) executed by the computer systems. Generally, the program modules may include routines, programs, target programs, assemblies, logics, data structures, and the like, to perform specific tasks or implement specific abstract data types. The computer systems/servers may be practiced in the distributed cloud computing environments in which tasks are executed by remote processing devices that are linked through a communications network. In the distributed computing environments, the program modules may be located in local or remote computing system storage media including storage devices.

FIG. 1 is a flowchart of a method for detecting an image category according to one embodiment of the present application. The method for detecting the image category according to the embodiment of the present application can execute the following steps by invoking a related instruction stored in a memory by a processor of an electronic device.

Step S100: a second image is down-sampled to obtain a first image.

In the embodiment of the present application, the second image is any high-resolution image, including, but not limited to, medical images and non-medical images. The first image is a low-resolution image, where the high resolution is relative to the low resolution. In step S100, the second image is down-sampled to obtain a first image with reduced resolution.

In the embodiment of the present application, the second image can be an image frame in a video sequence from an image collecting device, and can also be an independent frame of image or an image, or can be from other devices. The embodiment of the present application does not limit the source and obtaining approach of the second image.

In an optional example, step S100 may be performed by a processor by invoking a corresponding instruction stored in a memory, and may also be performed by a down-sampling module 50 run by the processor.

Step S102: at least one key sub-region in the second image relative to category detection is determined.

In the embodiment of the present application, the key sub-region can be considered as a local region of the second image, where the key is a relative meaning. The key sub-region mainly refers to a region of high importance relative to category detection. In general, the key sub-region has a great influence on the accuracy of the category detection result relative to other region of the second image.

The determining mode of the key sub-region is flexible, and is not limited in the embodiment of the present application. For example, some regions in the image are determined as key sub-regions according to actual application requirements of the category detection. For example, in the lesion category detection of a medical fundus image, a fundus region that is prone to lesions in the clinical experience is the key sub-region. For another example, in an animal category detection image, a focused region in actual photographing is the key sub-region, and so on. For another example, the key sub-region can be determined according to a deep learning mode. For example, the key sub-region can be determined by adopting, but not limited to an attention mechanism-based neural network, and so on.

In an optional example, step S102 may be performed by a processor by invoking a corresponding instruction stored in a memory, and may also be performed by a determining module 52 run by the processor.

Step S104: a feature of the first image and a feature of each key sub-region are extracted, respectively.

In the embodiment of the present application, the feature of the first image and the feature of the at least one key sub-region can be extracted based on a neural network (including, but not limited to, a convolutional neural network), and the feature of the first image and the feature of the at least one key sub-region can also be extracted based on a non-neural network (including, but not limited to, a color histogram method). The technical measures for feature extraction are not limited in the embodiment of the present application.

In an optional example, step S104 may be performed by a processor by invoking a corresponding instruction stored in a memory, and may also be performed by an extracting module 54 run by the processor.

Step S106: a category detection result of the second image is generated at least based on the extracted feature of the first image and feature of the at least one key sub-region.

In the embodiment of the present application, a category detection result of the second image is generated by combining the feature of the first image and the feature of the at least one key sub-region. The category detection result is used for indicating which of the predetermined plurality of categories the second image belongs to, and/or the probability that the second image belongs to the predetermined plurality of categories, respectively. The predetermined plurality of categories can be determined according to actual needs, for example, can be a plurality of animal categories, or a plurality of plant varieties, or a plurality of categories indicating different degrees of medical lesions, and the like.

In an optional example, step S106 may be performed by a processor by invoking a corresponding instruction stored in a memory, and may also be performed by a generating module 56 run by the processor.

Based on the technical solution provided by the embodiment of the present application, a second image is down-sampled to obtain a first image. The second image is any high-resolution image, including, but not limited to, medical images and non-medical images. The first image is a low-resolution image, including, but not limited to, medical images and non-medical images. The high resolution is relative to the low resolution. On the one hand, the feature of the low-resolution first image and the feature of each key sub-region of the high-resolution second image are extracted, respectively, and a category detection result of the high-resolution second image is generated at least based on the extracted features, so as to achieve category detection of the high-resolution second image by combining the feature of the low-resolution first image and the feature of the high-resolution key sub-region, thereby avoiding direct category detection of the high-resolution second image, reducing the calculation amount, saving hardware computing resources, and facilitating improvements of the operation speed and concurrent processing capacity. On the other hand, the key sub-region of the high-resolution second image is determined, key or important information in the high-resolution second image for category detection is remained, and a category detection result of the high-resolution second image is generated by combining the feature of the high-resolution key sub-region and the feature of the low-resolution first image, so as to avoid key information loss caused by performing direct category detection according to a low-resolution image obtained by down-sampling a high-resolution image, thereby improving the category detection accuracy of the high-resolution second image.

Figure 2:
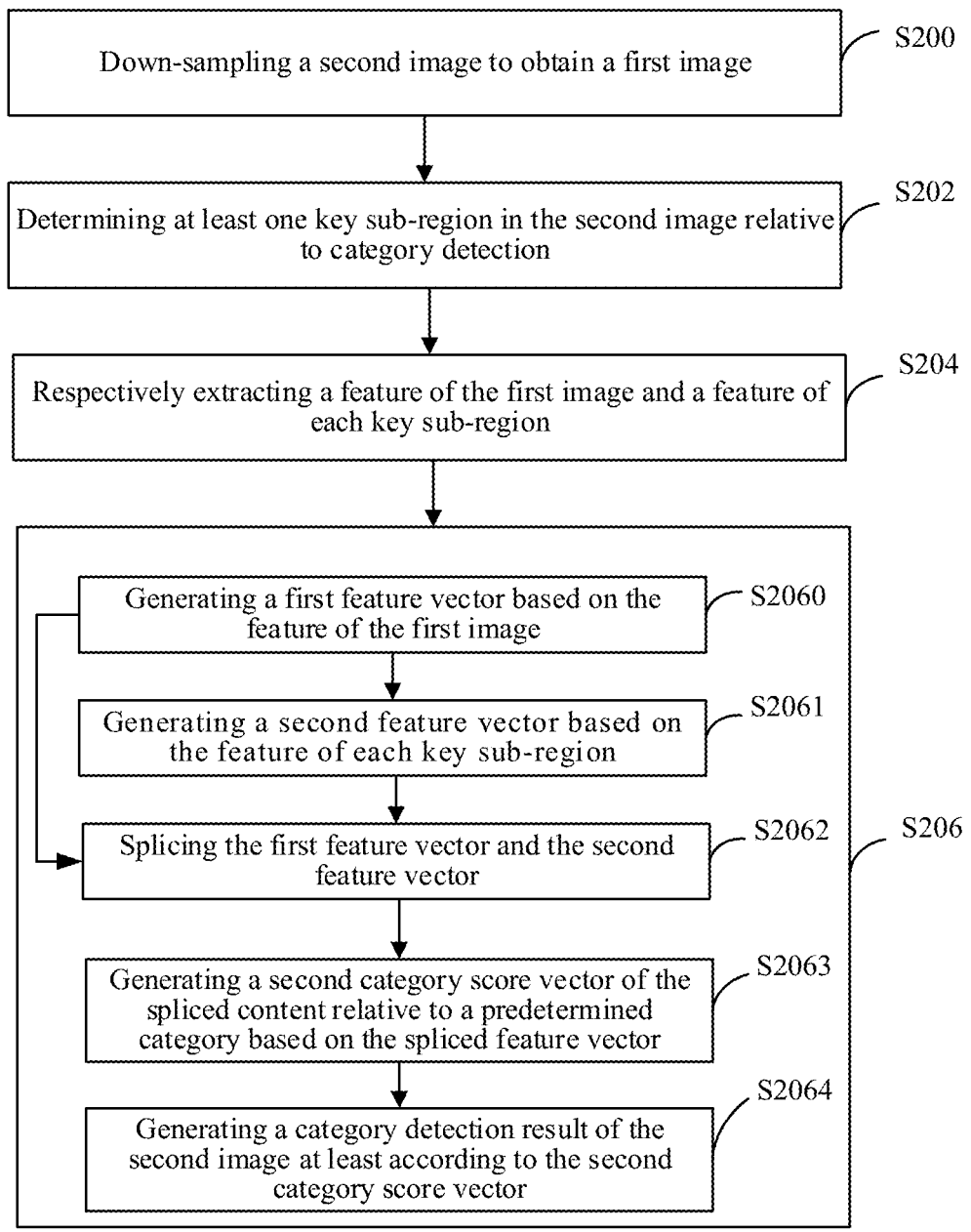
FIG. 2 is a flowchart of a method for detecting an image category according to another embodiment of the present application.

FIG. 2 is a flowchart of a method for detecting an image category according to another embodiment of the present application. It should be noted that the parts described in the embodiments of the present application have different emphases. The parts that are not described in detail in a certain embodiment can be referred to introduction and description in other embodiments of the present application, and details are not described below again.

The embodiment of the present application can be applied to, but not limited to, a neural network. For convenience of description, the embodiment of the present application is described by taking a convolutional neural network as an example. It should be understood that the embodiment of the present application can also be applied to a non-convolutional neural network, such as a fully-connected neural network and a reinforcement learning neural network, and details are not described in the embodiments of the present application. In addition, the embodiment of the present application can also be applied to a non-neural network, such as a classifier using a support vector machine, a random forest or other non-neural network, and the like. Details are not described in the embodiments of the present application.

Figure 3:
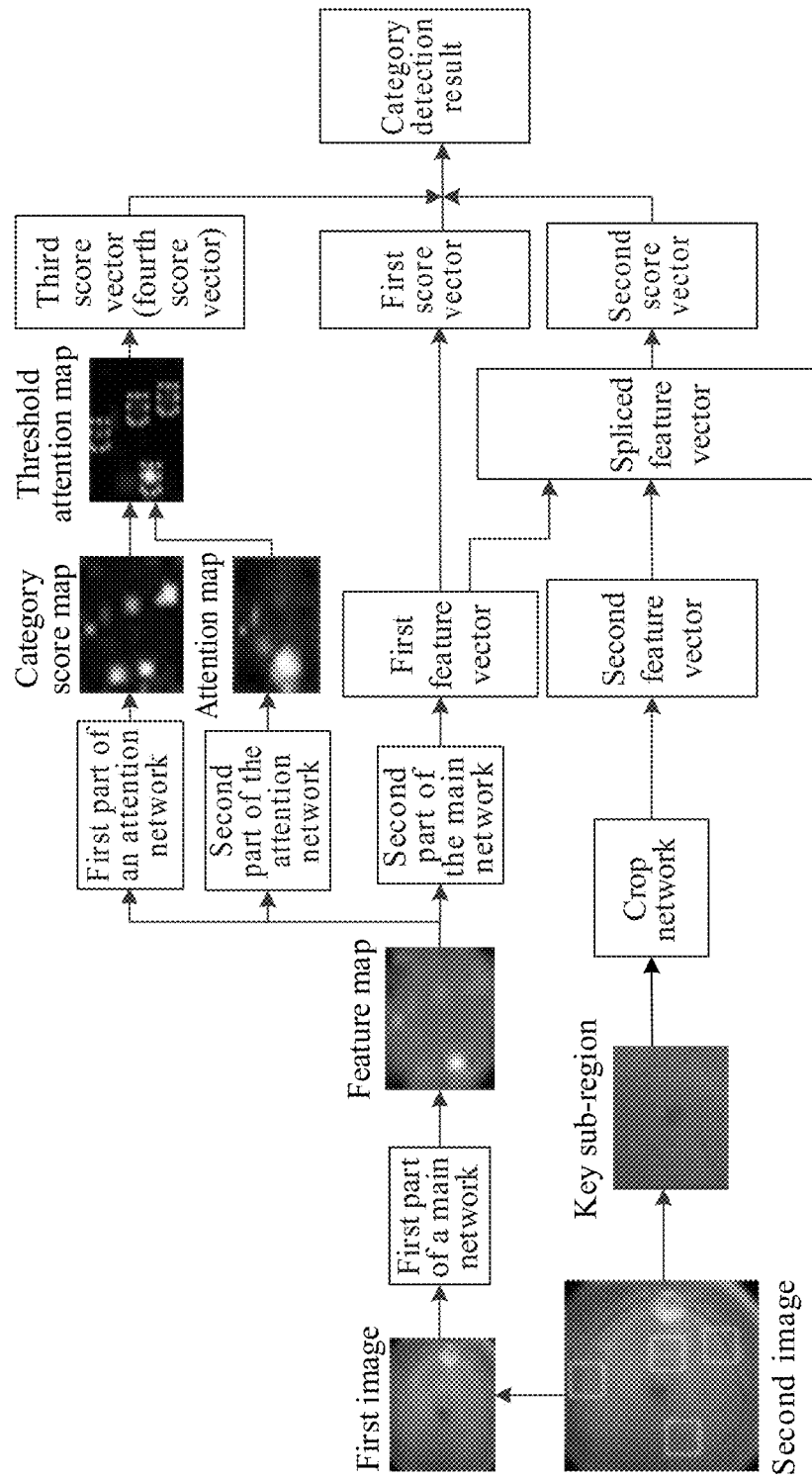
FIG. 3 is a schematic diagram of a process flow of a method for detecting an image category according to another embodiment of the present application.

The convolutional neural network of the embodiment of the present application can be divided into the following three parts according to functions, as shown in FIG. 3, including a Main Network (M-Net), an Attention Network (A-Net), and a Crop Network (C-Net). The M-Net is mainly used to extract a Feature Map and generate a feature vector according to the feature map. The A-Net is mainly used to generate an attention map and a category score map according to the feature map. The C-Net is mainly used to extract the feature of the high-resolution key sub-region and generate a feature vector. As shown in FIG. 2, the method for detecting the image category in the embodiment of the present application includes the following steps.

Step S200: a second image is down-sampled to obtain a first image.

In the embodiment of the present application, a high-resolution second image is down-sampled to obtain a low-resolution first image. In an example, the resolution can be determined according to a hardware device and an application environment running the convolutional neural network. In an example, the resolution of the second image and/or the first image can be increased as much as possible in a case where the conditions such as the hardware device and the application environment are met.

In an optional example, step S200 may be performed by a processor by invoking a corresponding instruction stored in a memory, and may also be performed by a down-sampling module 60 run by the processor.

Step S202: at least one key sub-region in the second image relative to category detection is determined.

In the embodiment of the present application, the category in the category detection can be flexibly defined, such as a certain type of disease occurrence level corresponding to a medical image, or a category of detection target corresponding to the presence/absence of a non-medical image, or an animal or animal-free category, etc., and the embodiments of the present application do not limit the categories.

The determining mode of the key sub-region of the embodiment of the present application is flexible. The key sub-region can be determined based on the attention mechanism, and the implementation of the key sub-region based on the attention mechanism is also flexible. Illustration is made below with examples. It should be understood that the implementations in the following examples are not exhaustive, and a person skilled in the art can adopt other similar solutions which are not mentioned in the embodiment of the present application under the teachings of the technical solutions disclosed in the embodiment of the present application.

For example, in an optional implementation, the key sub-region of the second image is determined based on an attention map of the first image.

An attention map of the first image is generated based on the feature of the first image and by means of an attention neural network. A region with the strongest attention response in the attention map is determined to be a first sub-region. A region in the second image corresponding to the first sub-region is determined to be the key sub-region.

Figure 4:
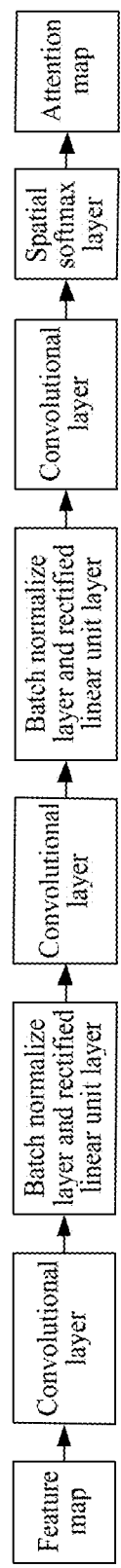
FIG. 4 is a schematic structural diagram of an attention neural network in a method for detecting an image category according to another embodiment of the present application.

According to one or more embodiments of the present disclosure, feature extraction is performed on the first image by means of a first part of the M-Net to obtain a feature map of the first image. The first part of the M-Net is mainly used to perform feature extraction on the first image. The first part of the M-Net can be implemented by using an Inception-ResNet. The embodiment of the present application does not limit the implementation structure of the first part of the M-Net. An attention map of the first image is then generated by means of a second part of the A-Net, i.e., an attention neural network based on the feature map of the first image. The attention neural network serves as a part of the A-Net, mainly including a convolutional layer, a Rectified Linear Unit (ReLU) layer, a Batch Normalize (BN) layer, and a spatial softmax layer, as shown in FIG. 4. The feature map is sequentially operated by the convolutional layer, the BN layer, and the ReLU layer of the attention neural network, the convolutional layer, the BN layer, and the ReLU layer, the convolutional layer, and the spatial softmax layer to obtain attention maps corresponding to different categories. The spatial softmax layer is used to gather energy on each attention map to a region of the strongest response, and reduce the energy of other regions. The energy on the attention map is used to indicate the importance of each region in the first image to category detection. The region of the strongest response is used to indicate the most important region for category detection, i.e., a first sub-region. The coordinates of the first sub-region are converted into coordinates in the second image, and the key sub-regions are determined in the second image according to the converted coordinates.

For another example, in an optional implementation, the key sub-region of the second image is determined based on a threshold attention map of the first image.

An attention map of the first image is generated based on the feature of the first image and by means of an attention neural network. A category score map of the first image is generated based on the feature of the first image and by means of a category scoring neural network. A threshold attention map of the first image is generated based on the attention map and the category score map. At least one first sub-region of which the attention response intensity is sorted from strong to weak is determined according to a sequence of attention response intensity of different regions in the threshold attention map. A region in the second image corresponding to the at least one first sub-region is determined to be the at least one key sub-region.

According to one or more embodiments of the present disclosure, feature extraction is performed on the first image by means of a first part of the M-Net to obtain a feature map of the first image. The first part of the M-Net is mainly used to perform feature extraction on the first image. The embodiment of the present application does not limit the implementation structure of the first part of the M-Net. A category score map of the first image is generated by means of a first part of the A-Net, i.e., a category scoring neural network based on the feature map of the first image. The first part of the A-Net may be, but not limited to, a convolutional layer with the convolution kernel size of 1*1 (it should be understood that the convolution kernel size is only an example, and is not intended to limit). The embodiment of the present application does not limit the implementation structure of the category scoring neural network. After the attention map and the category score map of the first image are obtained, a point multiplication operation is performed on the attention map and the category score map to obtain a threshold attention map.

According to one or more embodiments of the present disclosure, the first sub-region in the embodiment of the present application may be, but not limited to, a rectangular region. The embodiment of the present application does not limit the shape of the first sub-region. Since the key sub-region corresponds to the first sub-region, the shape of the key sub-region is the same as that of the first sub-region.

In the embodiment of the present application, the attention map differs from the threshold attention map in that a response region determined based on the attention map is generally a region of the strongest attention response, and a response region determined based on the threshold attention map includes a plurality of regions of stronger attention response. A further advantage of determining the key sub-region by using the threshold attention map is that more key sub-regions can be found, which is beneficial to improve the accuracy of image category detection.

In addition to the above-mentioned optional modes of determining the key sub-region of the second image, at least one key sub-region in the second image relative to category detection is determined according to labeling information of the second image, where the labeling information of the second image is determined based on experience or other modes, and is added in the second image. In general, a position region including the labeling information in the second image is determined as the key sub-region in the second image. Alternatively, a region in the second image corresponding to at least one predetermined position can also be determined to be at least one key sub-region. The predetermined position is a position that has a strong influence on category detection, or a position that is statistically summarized according to a large number of category detection results.

In an optional example, step S202 may be performed by a processor by invoking a corresponding instruction stored in a memory, and may also be performed by a determining module 62 run by the processor.

Step S204: a feature of the first image and a feature of at least one key sub-region are extracted, respectively.

According to one or more embodiments of the present disclosure, feature extraction is performed on the first image and at least one key sub-region by the first part of the M-Net to obtain a feature of the first image and a feature of at least one key sub-region.

In an optional example, step S204 may be performed by a processor by invoking a corresponding instruction stored in a memory, and may also be performed by an extracting module 64 run by the processor.

Step S206: a category detection result of the second image is generated at least based on the extracted feature of the first image and feature of the at least one key sub-region.

In the embodiment of the present application, the category detection result of the second image may include a wider range, for example, may include any one or more of the following: a category to which the second image belongs (e.g., the second image belongs to a predetermined category L1), and the probability that the second image belongs to a predetermined category (e.g., the probability G1 that the second image belongs to the predetermined category L1, and the probability G2 that the second image belongs to the predetermined category L2).

In addition to the category detection results of the second image, in the embodiment of the present application, the category detection result of the second image may also include any one or more of the following: at least one key sub-region (e.g., one or more regions in the second image of higher importance to category detection), and position information of at least one key sub-region (e.g., coordinate information or pixel information of one or more regions in the second image of higher importance to category detection).

The embodiment of the present application can determine the content of the category detection result according to the actual application requirement. For example, according to the technical solution provided by the embodiment of the present application, the image category can be obtained, and the related information of the key sub-region for performing the image category determination can be obtained, so as to provide richer and more effective information for category determination, which is beneficial to improve the accuracy and efficiency of category determination.

In an optional example, step S206 may be performed by a processor by invoking a corresponding instruction stored in a memory, and may also be performed by a generating module 66 run by the processor.

According to one or more embodiments of the present disclosure, step S206 may include the following sub-steps.

Sub-step S2060: a first feature vector is generated based on a feature of a first image.

In sub-step S2060, the first feature vector is generated by means of a second part of the M-Net based on a feature map of the first image, and the second part of the M-Net is mainly used to convert the feature map into a feature vector.

In an optional example, sub-step S2060 may be performed by a processor by invoking a corresponding instruction stored in a memory, and may also be performed by a first feature vector generating sub-module 661 run by the processor.

Sub-step S2061: a second feature vector is generated based on a feature of at least one key sub-region.

In sub-step S2061, the second feature vector is generated by means of the C-Net based on the feature of at least one key sub-region. The C-Net may be an inception network. The embodiment of the present application does not optionally limit the structure of the C-Net.

In an optional example, sub-step S2061 may be performed by a processor by invoking a corresponding instruction stored in a memory, and may also be performed by a second feature vector generating sub-module 662 run by the processor.

Sub-step S2062: the first feature vector and the second feature vector are spliced.

In an optional example, sub-step S2062 may be performed by a processor by invoking a corresponding instruction stored in a memory, and may also be performed by a splicing sub-module 663 run by the processor.

Sub-step S2063: a second category score vector of the spliced content relative to the predetermined category is generated based on the spliced feature vector.

The spliced content includes the first image and the at least one key sub-region. Sub-step S2063: a second category score vector of the spliced content relative to the predetermined category is generated by means of a fully-connected layer based on the spliced feature vector. Sub-step S2063 is executed by a neural network (the neural network may be a fully-connected neural network), or a non-neural network (such as a classifier using a support vector machine, a random forest or other non-neural network).

In an optional example, sub-step S2063 may be performed by a processor by invoking a corresponding instruction stored in a memory, and may also be performed by a second category score vector generating sub-module 664 run by the processor.

Sub-step S2064: a category detection result of the second image is generated at least according to the second category score vector.

In an optional example, sub-step S2064 may be performed by a processor by invoking a corresponding instruction stored in a memory, and may also be performed by a category detection result generating sub-module 665 run by the processor.

The determining mode of the category detection result in the embodiment of the present application is flexible. As shown in FIG. 3, for example, the category detection result can be determined according to a second category score vector, and can also be determined according to a first category score vector and the second category score vector, and can further be determined according to the first category score vector, the second category score vector, and a third category score vector (or a fourth category score vector). When the third category score vector (or the fourth category score vector) is determined, the third category score vector is generated according to the attention map, a threshold attention map is generated according to the attention map and the category score map, and the fourth category score vector is generated according to the threshold attention map. Illustration is made below with examples. It should be understood that the implementations in the following examples are not exhaustive, and a person skilled in the art can adopt other similar solutions which are not mentioned in the embodiment of the present application under the teachings of the technical solutions disclosed in the embodiment of the present application.

For example, in an optional implementation, a first category score vector of the first image relative to the predetermined category is generated based on the first feature vector, and a category detection result of the second image is generated at least according to the first category score vector and the second category score vector. The operation of generating a first category score vector may refer to the operation of generating a second score vector, and details are not described herein again. When the category detection result of the second image is generated according to the first category score vector and the second category score vector, the first category score vector and the second category score vector are averaged or weighted, and the averaged value or the weighted vector is converted into a category probability vector by a regression operation, and the category probability vector is used as a category detection result of the second image. The technical measure adopted by the embodiment of the present application for generating the category detection result of the second image is not limited.

For example, in an optional implementation, a third category score vector of the first image relative to the predetermined category is generated based on the attention map, and a category detection result of the second image is generated at least according to the third category score vector and the second category score vector. The third category score vector is generated by means of a global average pooling operation based on the attention map. When the category detection result of the second image is generated at least according to the third category score vector and the second category score vector, a first category score vector of the first image relative to the predetermined category is generated based on the first feature vector, and a category detection result of the second image is generated according to the first category score vector, the second category score vector, and the third category score vector. For example, the first category score vector, the second category score vector, and the third category score vector are averaged or weighted, and the averaged or weighted vector is converted into a category probability vector by a regression operation, and the category probability vector is used as a category detection result of the second image.

For example, in an optional implementation, a fourth category score vector of the first image relative to the predetermined category is generated based on the threshold attention map, and a category detection result of the second image is generated at least according to the fourth category score vector and the second category score vector. The fourth category score vector is generated by means of a global average pooling operation based on the threshold attention map. When the category detection result of the second image is generated at least according to the fourth category score vector and the second category score vector, a first category score vector of the first image relative to the predetermined category is generated based on the first feature vector, and a category detection result of the second image is generated according to the first category score vector, the second category score vector, and the fourth category score vector. For example, the first category score vector, the second category score vector, and the fourth category score vector are averaged or weighted, and the averaged or weighted vector is converted into a category probability vector by a regression operation, and the category probability vector is used as a category detection result of the second image.

Based on the technical solution provided by the embodiment of the present application, a second image is down-sampled to obtain a first image. The second image is any high-resolution image, including, but not limited to, medical images and non-medical images. The first image is a low-resolution image, including, but not limited to, medical images and non-medical images. The high resolution is relative to the low resolution. On the one hand, the feature of the low-resolution first image and the feature of at least one key sub-region of the high-resolution second image are extracted, respectively, and a category detection result of the high-resolution second image is generated at least based on the extracted features, so as to achieve category detection of the high-resolution second image by combining the feature of the low-resolution first image and the feature of the high-resolution key sub-region, thereby avoiding direct category detection of the high-resolution second image, reducing the calculation amount, saving hardware computing resources, and facilitating improvements of the operation speed and concurrent processing capacity. On the other hand, the key sub-region of the high-resolution second image is determined, key or important information in the high-resolution second image for category detection is remained, and a category detection result of the high-resolution second image is generated by combining the feature of the high-resolution key sub-region and the feature of the low-resolution first image, so as to avoid key information loss caused by performing direct category detection according to a low-resolution image obtained by down-sampling a high-resolution image, thereby improving the category detection accuracy of the high-resolution second image.

In the embodiment of the present application, the key sub-region can be determined according to labeling information or a predetermined position of the second image, and can also be determined based on the attention map of the first image, and can further be determined based on the threshold attention map of the first image. Therefore, a plurality of technical measures of determining the key sub-region of the second image is provided. Determining the key sub-region based on the threshold attention map can find more key sub-regions, which improves the accuracy of image category detection.

On the basis of the foregoing embodiment, the image is defined as a medical image. The technical solutions of image category detection of the foregoing embodiments are applied to medical image detection scenarios. The medical images are detected according to the technical solutions in the embodiments of the present application. In view of the above, an embodiment of the present disclosure further provides a method for detecting a medical image, including: down-sampling a second medical image to obtain a first medical image; determining at least one key sub-region in the second medical image relative to predetermined disease level detection; respectively extracting a feature of the first medical image and a feature of the at least one key sub-region; and generating a disease diagnosis result of the second medical image at least based on the extracted features. Accordingly, in the method for detecting the image category of the foregoing embodiments, the predetermined category to which the second image belongs is the predetermined disease level, and a category detection result of the second image is a disease diagnosis result.

Based on the method for detecting the medical image of the embodiment of the present application, a high-resolution second medical image is down-sampled to obtain a low-resolution first medical image, at least one key sub-region in the high-resolution second medical image relative to the disease level detection is determined, a lesion region in the high-resolution second medical image is displayed by means of the key sub-region, a feature of the low-resolution first medical image and a feature of at least one high-resolution key sub-region are extracted respectively, and a disease diagnosis result of the high-resolution second medical image is generated at least based on the extracted features. On the one hand, disease diagnosis is performed on the high-resolution second medical image by combining the feature of the low-resolution first medical image and the feature of the high-resolution key sub-region, so as to avoid direct disease diagnosis of the high-resolution second medical image, reduce the calculation amount, save hardware computing resources, and facilitate improvements of the operation speed and concurrent processing capacity. On the other hand, the key sub-region of the high-resolution second medical image is determined, key precision information in the high-resolution second medical image for disease diagnosis is remained, and a disease diagnosis result of the high-resolution second medical image is generated by combining the feature of the high-resolution key sub-region and the feature of the low-resolution first medical image, so as to avoid key information loss caused by performing direct disease diagnosis according to a low-resolution image obtained by down-sampling a high-resolution image, thereby improving the disease diagnosis accuracy of the high-resolution second medical image.

The convolutional neural network of the embodiment of the present application can be divided into the following three parts according to functions, i.e., an M-Net, an A-Net, and a C-Net. The M-Net is used to determine a feature map. The A-Net is used to determine a threshold attention map. The C-Net is used to perform feature extraction on the key sub-region, and generate a feature vector. The three parts are independent of each other and are interrelated. The embodiment of the present application can train the convolutional neural network only by using sample data of a weak supervision condition. Taking a scenario applied to retinal image detection as an example, the convolutional neural network training is performed on training data containing only a retinal image and a diagnosis result, without relying on training data labeled with both lesion regions and diagnosis results, thereby reducing the requirement for the training data. The trained convolutional neural network can also generate a threshold attention image while detecting the disease level of retinopathy, which displays the role of each pixel in the retinal image in the disease diagnosis, and then determines the lesion region by means of the threshold attention image.

In the scenario of detecting the medical image, the disease diagnosis result of the second medical image may include any one or more of the following: the predetermined disease level to which the second medical image belongs, and the probability that the second medical image belongs to a predetermined disease level, respectively. Taking the detection of retinal images as an example, the disease diagnosis result of the retinal image may be the disease level to which the retinal image belongs (such as normal, mild lesions, moderate lesions, severe lesions, and proliferative lesions), and may also be the probability that the retinal image is normal, the probability that the retinal image belongs to a mild lesion, the probability that the retinal image belongs to a moderate lesion, the probability that the retinal image belongs to a severe lesion, and the probability that the retinal image belongs to a proliferative lesion. In addition to the disease diagnosis result, the disease diagnosis result of the second medical image further includes any one or more of the following: at least one key sub-region (such as a lesion region), and position information of the at least one key sub-region (such as coordinate information or pixel information of the lesion region). The embodiment of the present application can determine the content of the category detection result according to the actual application requirement. For example, in the diagnosis process of diseases, including, but not limited to, diabetic retinopathy in the field of medicines, according to the technical solution provided by the embodiment of the present application, the image category representing the disease level can be obtained, and the related information representing the key sub-region of the lesion region can be obtained, so as to provide richer and more effective information for disease diagnosis, which is beneficial to improve the accuracy and efficiency of disease diagnosis.

The determining mode of the key sub-region of the embodiment of the present application is flexible. For example, in an optional implementation, at least one key sub-region in the second medical image relative to predetermined disease level detection is determined through the following modes: determining at least one key sub-region in the second medical image relative to predetermined disease level detection according to labeling information of the second medical image; or, determining a region in the second medical image corresponding to at least one predetermined position to be the at least one key sub-region.

For another example, in another optional implementation, at least one key sub-region in the second medical image relative to predetermined disease level detection is determined through the following modes: generating an attention map of the first medical image based on the feature of the first medical image and by means of an attention neural network; determining a region with the strongest attention response in the attention map to be a first sub-region; and determining a region in the second medical image corresponding to the first sub-region to be the key sub-region.

For another example, in another optional implementation, at least one key sub-region in the second medical image relative to predetermined disease level detection is determined through the following modes: generating an attention map of the first medical image based on the feature of the first medical image and by means of an attention neural network; generating a disease level score map of the first medical image based on the feature of the first medical image and by means of a disease level scoring neural network; generating a threshold attention map, such as a point multiplication attention map and a disease level score map, of the first medical image based on the attention map and the disease level score map to obtain a threshold attention map; determining at least one first sub-region of which the attention response intensity is sorted from strong to weak according to a sequence of attention response intensity of different regions in the threshold attention map; and determining a region in the second medical image corresponding to the at least one first sub-region to be the at least one key sub-region.

The mode of generating a disease diagnosis result of the second medical image in the embodiment of the present application is flexible. For example, in an optional implementation, a first feature vector is generated based on the feature of the first medical image, a second feature vector is generated based on the feature of the at least one key sub-region, the first feature vector and the second feature vector are spliced, a second disease level score vector of the spliced content relative to the predetermined disease level is generated based on the spliced feature vector, where the spliced content includes the first medical image and the at least one key sub-region; and a disease diagnosis result of the second medical image is generated at least according to the second disease level score vector.

The generating a disease diagnosis result of the second medical image at least according to the second disease level score vector is for example achieved through the following mode: generating a first disease level score vector of the first medical image relative to the predetermined disease level based on the first feature vector; and generating a disease diagnosis result of the second medical image at least according to the first disease level score vector and the second disease level score vector. Alternatively, the generating a disease diagnosis result of the second medical image at least according to the second disease level score vector is achieved through the following mode: generating a third disease level score vector of the first medical image relative to the predetermined disease level based on the attention map; and generating a disease diagnosis result of the second medical image at least according to the third disease level score vector and the second disease level score vector. For example, a first disease level score vector of the first medical image relative to the predetermined disease level is generated based on the first feature vector, and a disease diagnosis result of the second medical image is generated according to the first disease level score vector, the second disease level score vector, and the third disease level score vector.

For another example, in another optional implementation, a fourth disease level score vector of the first medical image relative to the predetermined disease level is generated based on the threshold attention map, and a disease diagnosis result of the second medical image is generated at least according to the fourth disease level score vector and the second disease level score vector. For example, a first disease level score vector of the first medical image relative to the predetermined disease level is generated based on the first feature vector, and a disease diagnosis result of the second medical image is generated according to the first disease level score vector, the second disease level score vector, and the fourth disease level score vector.

The embodiment of the present application provides a variety of disease diagnosis results for medical image detection, and the doctor can diagnose the disease of a patient according to the disease diagnosis result, which is not only beneficial for diagnosing the level to which the disease belongs, and the probability that the disease belongs to the level, but also for determining the lesion region, so as to provide a rich and reliable diagnostic basis for disease diagnosis.

Any of the foregoing method for detecting an image category or a medical image provided by the embodiments of the present application may be performed by any suitable device having data processing capability, including, but not limited to, a terminal device, a server, and the like. Alternatively, any image category detection or medical image detection method provided by the embodiments of the present application may be executed by a processor. For example, any of the methods for detecting the image category or medical image mentioned in the embodiments of the present application is executed by the processor by invoking a corresponding instruction stored in a memory. Details are not described below again.

A person of ordinary skill in the art may understand that all or some steps for implementing the foregoing method embodiments are achieved by a program by instructing related hardware. The foregoing program can be stored in a computer readable storage medium. When the program is executed, steps including the foregoing method embodiments are executed. Moreover, the foregoing storage medium includes various media capable of storing program codes such as ROM, RAM, a magnetic disk, or an optical disk.

Figure 5:
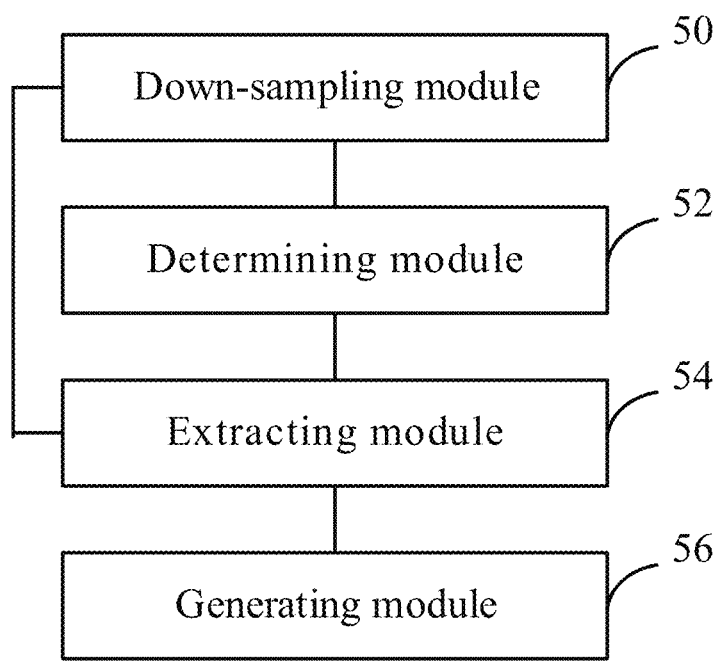
FIG. 5 is a structure block diagram of an apparatus for detecting an image category according to one embodiment of the present application.

FIG. 5 is a structure block diagram of an apparatus for detecting an image category according to one embodiment of the present application.

The apparatus for detecting the image category provided by the embodiment of the present application includes: a down-sampling module 50 configured to down-sample a second image to obtain a first image; a determining module 52 configured to determine at least one key sub-region in the second image relative to category detection; an extracting module 54 configured to respectively extract a feature of the first image and a feature of the at least one key sub-region; and a generating module 56 configured to generate a category detection result of the second image at least based on the extracted features.

The apparatus for detecting the image category of the embodiment of the present application is used for implementing the corresponding method for detecting the image category in the foregoing embodiments, and has the beneficial effect of a corresponding method embodiment. Details are not described herein again.

Figure 6:
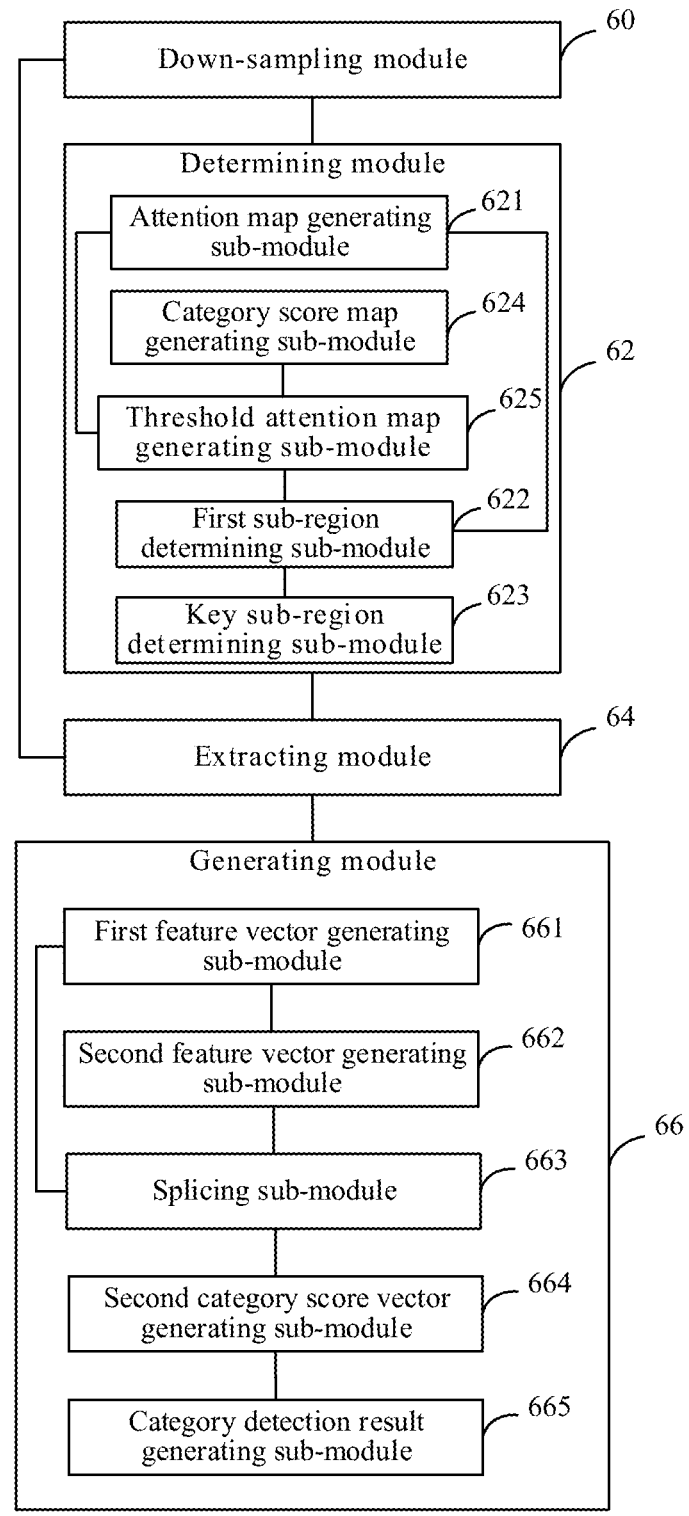
FIG. 6 is a structure block diagram of an apparatus for detecting an image category according to another embodiment of the present application.

FIG. 6 is a structure block diagram of an apparatus for detecting an image category according to another embodiment of the present application.

The apparatus for detecting the image category provided by the embodiment of the present application includes: a down-sampling module 60 configured to down-sample a second image to obtain a first image; a determining module 62 configured to determine at least one key sub-region in the second image relative to category detection; an extracting module 64 configured to respectively extract a feature of the first image and a feature of the at least one key sub-region; and a generating module 66 configured to generate a category detection result of the second image at least based on the extracted feature of the first image and feature of the at least one key sub-region.

According to one or more embodiments of the present disclosure, the category detection result of the second image includes any one or more of the following: a predetermined category to which the second image belongs, and the probability that the second image belongs to a predetermined category, respectively.

According to one or more embodiments of the present disclosure, the category detection result of the second image further includes any one or more of the following: at least one key sub-region, and position information of the at least one key sub-region.

According to one or more embodiments of the present disclosure, the determining module 62 is configured to determine at least one key sub-region in the second image relative to category detection according to labeling information of the second image, or determine a region in the second image corresponding to at least one predetermined position to be the at least one key sub-region.

According to one or more embodiments of the present disclosure, the determining module 62 includes: an attention map generating sub-module 621 configured to generate an attention map of the first image based on the feature of the first image and by means of an attention neural network; a first sub-region determining sub-module 622 configured to determine a region with the strongest attention response in the attention map to be a first sub-region; and a key sub-region determining sub-module 623 configured to determine a region in the second image corresponding to the first sub-region to be the key sub-region.

According to one or more embodiments of the present disclosure, the determining module 62 includes: an attention map generating sub-module 621 configured to generate an attention map of the first image based on the feature of the first image and by means of an attention neural network; a category score map generating sub-module 624 configured to generate a category score map of the first image based on the feature of the first image and by means of a category scoring neural network; a threshold attention map generating sub-module 625 configured to generate a threshold attention map of the first image based on the attention map and the category score map; a first sub-region determining sub-module 622 configured to determine at least one first sub-region of which the attention response intensity is sorted from strong to weak according to a sequence of attention response intensity of different regions in the threshold attention map; and a key sub-region determining sub-module 623 configured to determine a region in the second image corresponding to the at least one first sub-region to be the at least one key sub-region.

According to one or more embodiments of the present disclosure, the threshold attention map generating sub-module 625 is configured to perform point multiplication on the attention map and the category score map to obtain the threshold attention map.

According to one or more embodiments of the present disclosure, the generating module 66 includes: a first feature vector generating sub-module 661 configured to generate a first feature vector based on the feature of the first image; a second feature vector generating sub-module 662 configured to generate a second feature vector based on the feature of the at least one key sub-region; a splicing sub-module 663 configured to splice the first feature vector and the second feature vector; a second category score vector generating sub-module 664 configured to generate a second category score vector of the spliced content relative to the predetermined category based on the spliced feature vector, where the spliced content includes the first image and the at least one key sub-region; and a category detection result generating sub-module 665 configured to generate a category detection result of the second image at least according to the second category score vector.

According to one or more embodiments of the present disclosure, the category detection result generating sub-module 665 is configured to generate a first category score vector of the first image relative to the predetermined category based on the first feature vector, and generate a category detection result of the second image at least according to the first category score vector and the second category score vector.

According to one or more embodiments of the present disclosure, the category detection result generating sub-module 665 is configured to generate a third category score vector of the first image relative to the predetermined category based on the attention map, and generate a category detection result of the second image at least according to the third category score vector and the second category score vector.

According to one or more embodiments of the present disclosure, the category detection result generating sub-module 665 is configured to generate a first category score vector of the first image relative to the predetermined category based on the first feature vector, and generate a category detection result of the second image according to the first category score vector, the second category score vector, and the third category score vector.

According to one or more embodiments of the present disclosure, the category detection result generating sub-module 665 is configured to generate a fourth category score vector of the first image relative to the predetermined category based on the threshold attention map, and generate a category detection result of the second image at least according to the fourth category score vector and the second category score vector.

According to one or more embodiments of the present disclosure, the category detection result generating sub-module 665 is configured to generate a first category score vector of the first image relative to the predetermined category based on the first feature vector, and generate a category detection result of the second image according to the first category score vector, the second category score vector, and the fourth category score vector.

The apparatus for detecting the image category of the embodiment of the present application is used for implementing the corresponding method for detecting the image category in the foregoing embodiments, and has the beneficial effect of a corresponding method embodiment. Details are not described herein again.

Figure 7:
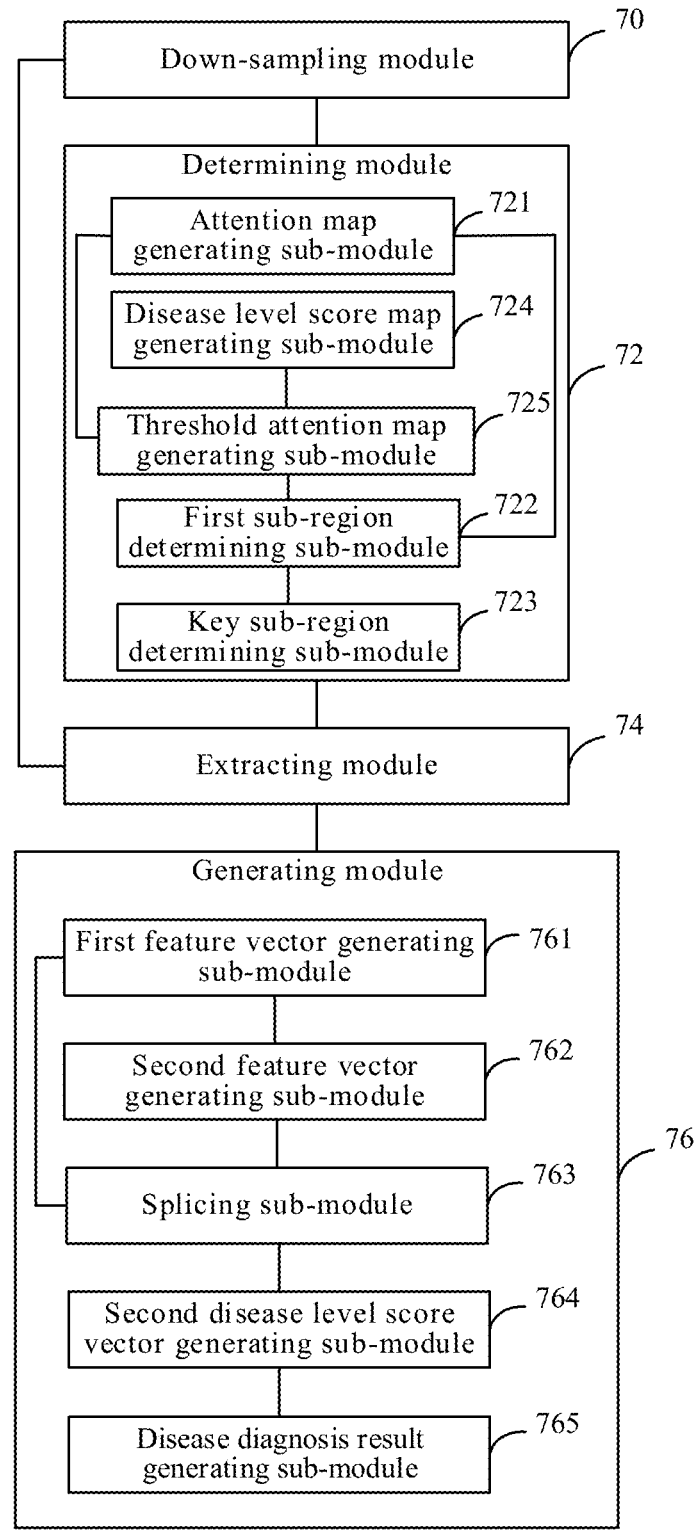
FIG. 7 is a structure block diagram of an apparatus for detecting a medical image according to one embodiment of the present application.

FIG. 7 is a structure block diagram of an apparatus for detecting a medical image according to one embodiment of the present application.

The apparatus for detecting the medical image provided by the embodiment of the present application includes: a down-sampling module 70 configured to down-sample a second medical image to obtain a first medical image; a determining module 72 configured to determine at least one key sub-region in the second medical image relative to predetermined disease level detection; an extracting module 74 configured to respectively extract a feature of the first medical image and a feature of the at least one key sub-region; and a generating module 76 configured to generate a disease diagnosis result of the second medical image at least based on the extracted features.

According to one or more embodiments of the present disclosure, the disease diagnosis result of the second medical image includes any one or more of the following: the disease level to which the second medical image belongs, and the probability that the second medical image belongs to a predetermined disease level, respectively.

According to one or more embodiments of the present disclosure, the category detection result of the second medical image further includes any one or more of the following: at least one key sub-region, and position information of the at least one key sub-region.

According to one or more embodiments of the present disclosure, the determining module 72 is configured to determine at least one key sub-region in the second medical image relative to predetermined disease level detection according to labeling information of the second medical image, or determine a region in the second medical image corresponding to at least one predetermined position to be the at least one key sub-region.

According to one or more embodiments of the present disclosure, the determining module 72 includes: an attention map generating sub-module 721 configured to generate an attention map of the first medical image based on the feature of the first medical image and by means of an attention neural network; a first sub-region determining sub-module 722 configured to determine a region with the strongest attention response in the attention map to be a first sub-region; and a key sub-region determining sub-module 723 configured to determine a region in the second medical image corresponding to the first sub-region to be the key sub-region.

According to one or more embodiments of the present disclosure, the determining module 72 includes: an attention map generating sub-module 721 configured to generate an attention map of the first medical image based on the feature of the first medical image and by means of an attention neural network; a disease level score map generating sub-module 724 configured to generate a disease level score map of the first medical image based on the feature of the first medical image and by means of a disease level scoring neural network; a threshold attention map generating sub-module 725 configured to generate a threshold attention map of the first medical image based on the attention map and the disease level score map; a first sub-region determining sub-module 722 configured to determine at least one first sub-region of which the attention response intensity is sorted from strong to weak according to a sequence of attention response intensity of different regions in the threshold attention map; and a key sub-region determining sub-module 723 configured to determine a region in the second medical image corresponding to the at least one first sub-region to be the at least one key sub-region.

According to one or more embodiments of the present disclosure, the threshold attention map generating sub-module 725 is configured to perform point multiplication on the attention map and the disease level score map to obtain the threshold attention map.

According to one or more embodiments of the present disclosure, the generating module 76 includes: a first feature vector generating sub-module 761 configured to generate a first feature vector based on the feature of the first medical image; a second feature vector generating sub-module 762 configured to generate a second feature vector based on the feature of the at least one key sub-region; a splicing sub-module 763 configured to splice the first feature vector and the second feature vector; a second disease level score vector generating sub-module 764 configured to generate a second disease level score vector of the spliced content relative to the predetermined disease level based on the spliced feature vector, where the spliced content includes the first medical image and the at least one key sub-region; and a disease diagnosis result generating sub-module 765 configured to generate a disease diagnosis result of the second medical image at least according to the second disease level score vector.

According to one or more embodiments of the present disclosure, the disease diagnosis result generating sub-module 765 is configured to generate a first disease level score vector of the first medical image relative to the predetermined disease level based on the first feature vector, and generate a disease diagnosis result of the second medical image at least according to the first disease level score vector and the second disease level score vector.

According to one or more embodiments of the present disclosure, the disease diagnosis result generating sub-module 765 is configured to generate a third disease level score vector of the first medical image relative to the predetermined disease level based on the attention map, and generate a disease diagnosis result of the second medical image at least according to the third disease level score vector and the second disease level score vector.

According to one or more embodiments of the present disclosure, the disease diagnosis result generating sub-module 765 is configured to generate a first disease level score vector of the first medical image relative to the predetermined disease level based on the first feature vector, and generate a disease diagnosis result of the second medical image according to the first disease level score vector, the second disease level score vector, and the third disease level score vector.

According to one or more embodiments of the present disclosure, the disease diagnosis result generating sub-module 765 is configured to generate a fourth disease level score vector of the first medical image relative to the predetermined disease level based on the threshold attention map, and generate a disease diagnosis result of the second medical image at least according to the fourth disease level score vector and the second disease level score vector.

According to one or more embodiments of the present disclosure, the disease diagnosis result generating sub-module 765 is configured to generate a first disease level score vector of the first medical image relative to the predetermined disease level based on the first feature vector, and generate a disease diagnosis result of the second medical image according to the first disease level score vector, the second disease level score vector, and the fourth disease level score vector.

The apparatus for detecting the medical image of the embodiment of the present application is used for implementing the corresponding method for detecting the medical image in the foregoing embodiments, and has the beneficial effect of a corresponding method embodiment. Details are not described herein again.

Figure 8:
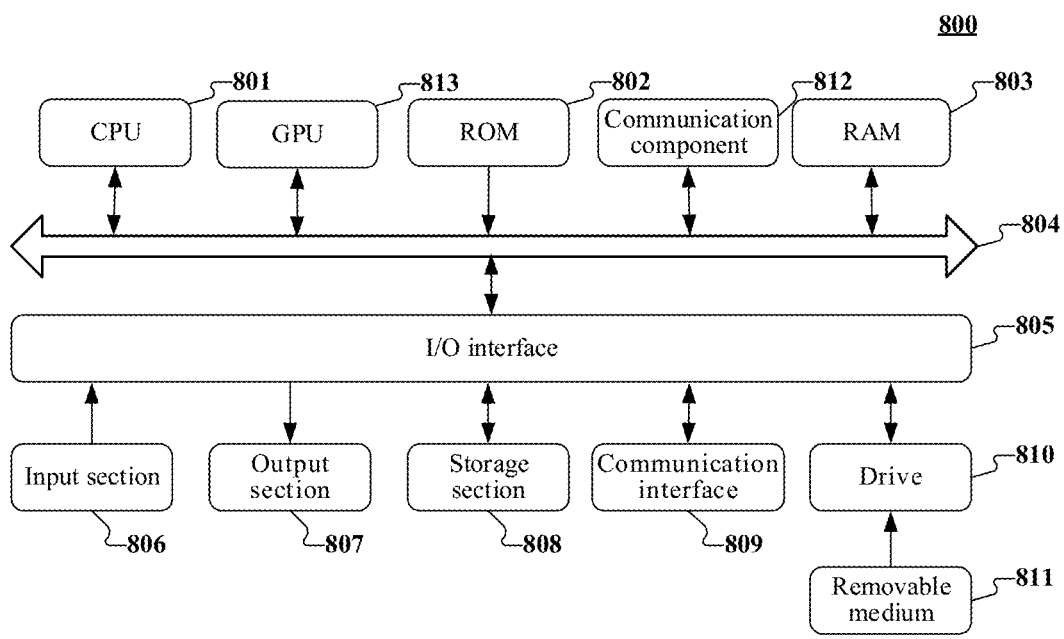
FIG. 8 is a schematic structural diagram of an electronic device according to one embodiment of the present application.

The embodiments of the present application further provide an electronic device which, for example, may be a mobile terminal, a Personal Computer (PC), a tablet computer, a server, and the like. Referring to FIG. 8 below, a schematic structural diagram of an electronic device 800 suitable for implementing the apparatus for detecting the image category or the apparatus for detecting the medical image provided by the embodiments of the present application is shown. As shown in FIG. 8, the electronic device 800 includes one or more processors, a communication element, and the like. The one or more processors are, for example, one or more Central Processing Units (CPUs) 801 and/or one or more Graphic Processing Units (GPUs) 813, and the processors may execute appropriate actions and processing according to executable instructions stored in a Read-Only Memory (ROM) 802 or executable instructions loaded from a storage section 808 to a Random Access Memory (RAM) 803. The communication element includes a communication component 812 and/or a communication interface 809. The communication component 812 may include, but is not limited to, a network card. The network card may include, but is not limited to, an InfiniBand (IB) network card. The communication interface 809 includes a communication interface of a network interface card such as an LAN card and a modem, and the communication interface 809 performs communication processing via a network such as the Internet.

The processor may communicate with the ROM 802 and/or the RAM 803 to execute executable instructions. The processor is connected to the communication component 812 via a communication bus 804, and communicates with other target devices via the communication component 812, thereby completing corresponding operations of any method for detecting an image category provided in the embodiments of the present application, e.g., down-sampling a second image to obtain a first image; determining at least one key sub-region in the second image relative to category detection; respectively extracting a feature of the first image and a feature of the at least one key sub-region; and generating a category detection result of the second image at least based on the extracted features. Alternatively, operations corresponding to any method for detecting an image category provided by the embodiment of the present application are implemented, for example, through down-sampling a second medical image to obtain a first medical image; determining at least one key sub-region in the second medical image relative to predetermined disease level detection; respectively extracting a feature of the first medical image and a feature of the at least one key sub-region; and generating a disease diagnosis result of the second medical image at least based on the extracted features.

In addition, the RAM 803 further stores programs and data required for operations of an apparatus. The CPU 801 or GPU 813, the ROM 802, and the RAM 803 are connected to each other by means of the communication bus 804. In the case that the RAM 803 exists, the ROM 802 is an optional module. The RAM 803 stores executable instructions, or writes the executable instructions to the ROM 802 during running, where the executable instructions enable the processor to perform corresponding operations of the foregoing communication method. An Input/output (I/O) interface 805 is also connected to the communication bus 804. The communication component 812 may be integrated, or may be configured to have a plurality of sub-modules (for example, a plurality of IB network cards) linked on the communication bus.

The following components are connected to the I/O interface 805: an input section 806 including a keyboard, a mouse and the like; an output section 807 including a Cathode-Ray Tube (CRT), a Liquid Crystal Display (LCD), a loudspeaker and the like; a storage section 808 including hardware and the like; and the communication interface 809 of a network interface card including an LAN card, a modem and the like. A drive 810 is also connected to the I/O interface 805 according to requirements. A removable medium 811 such as a magnetic disk, an optical disk, a magneto-optical disk, a semiconductor memory or the like is mounted on the drive 810 according to requirements, so that a computer program read from the removable medium is installed on the storage section 808 according to requirements.

It should be noted that the architecture illustrated in FIG. 8 is merely an optional implementation mode. During specific practice, the number and types of the components in FIG. 8 may be selected, decreased, increased, or replaced according to actual requirements. Different functional components may be separated or integrated or the like. For example, the GPU and the CPU may be separated, or the GPU may be integrated on the CPU, and the communication element may be separated from or integrated on the CPU or the GPU or the like. These alternative implementations all fall within the scope of protection of the present application.

According to the embodiments of the present application, the process described above with reference to the flowchart may be implemented as a computer software program. For example, the embodiment of the present application includes a computer program product, including a computer program tangibly included in a machine-readable medium. The computer program includes a readable program code for executing the method shown in the flowchart. The program code may include instructions for correspondingly executing corresponding steps of any method for detecting an image category or a medical image provided by the embodiment of the present application, for example, down-sampling a second image to obtain a first image; determining at least one key sub-region in the second image relative to category detection; respectively extracting a feature of the first image and a feature of the at least one key sub-region; and generating a category detection result of the second image at least based on the extracted features. For another example, a second medical image is down-sampled to obtain a first medical image, at least one key sub-region in the second medical image relative to predetermined disease level detection is determined, a feature of the first medical image and a feature of the at least one key sub-region are respectively extracted, and a disease diagnosis result of the second medical image is generated at least based on the extracted features. In such embodiments, the computer program may be downloaded from a network by means of the communication element and installed, and/or be installed from the removable medium 811. When the computer program is executed by the processor, functions provided in the method according to the embodiments of the present application are executed.

In addition, the embodiments of the present application also provide a computer readable storage medium for storing a computer readable instruction, where the instruction is executed to achieve operations of steps in the method for detecting the image category or the method for detecting the medical image according to any of the foregoing embodiments of the present application, for example, down-sampling a second image to obtain a first image; determining at least one key sub-region in the second image relative to category detection; respectively extracting a feature of the first image and a feature of the at least one key sub-region; and generating a category detection result of the second image at least based on the extracted features. For another example, a second medical image is down-sampled to obtain a first medical image, at least one key sub-region in the second medical image relative to predetermined disease level detection is determined, a feature of the first medical image and a feature of the at least one key sub-region are respectively extracted, and a disease diagnosis result of the second medical image is generated at least based on the extracted features.

The embodiments in the specification are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods, apparatuses, electronic devices and storage media of the present application may be implemented in many manners. For example, the methods, apparatuses, electronic devices and storage media according to the embodiments of the present application may be implemented by using software, hardware, firmware, or any combination of software, hardware, and firmware. Unless otherwise specially stated, the foregoing optional sequences of steps of the methods are merely for description, and are not intended to limit the steps of the methods in the embodiments of the present application. In addition, in some embodiments, the present application may be implemented as programs recorded in a recording medium. The programs include machine readable instructions for implementing the methods according to the embodiments of the present application. Therefore, the present application further covers the recording medium storing the programs for performing the methods according to the embodiments of the present application.

The descriptions of the embodiments of the present application are provided for the purpose of examples and description, and are not intended to be exhaustive or limit the present application to the disclosed form. Many modifications and changes are obvious to a person of ordinary skill in the art. The embodiments are selected and described to better describe a principle and an actual application of the present application, and to make a person of ordinary skill in the art understand the present application, so as to design various embodiments with various modifications applicable to particular use.

The invention claimed is:

1. A method for detecting an image category, comprising:
down-sampling a second image to obtain a first image;
determining at least one key sub-region in the second image relative to category detection;
respectively extracting a feature of the first image and a feature of the at least one key sub-region; and
generating a category detection result of the second image at least based on the extracted feature of the first image and feature of the at least one key sub-region,
wherein the determining at least one key sub-region in the second image relative to category detection comprises:
generating an attention map of the first image based on the feature of the first image through an attention neural network;
determining a region with the strongest attention response in the attention map to be a first sub-region; and
determining a region of the second image corresponding to the first sub-region to be the key sub-region,
or,
wherein the determining at least one key sub-region in the second image relative to category detection comprises:
generating an attention map of the first image based on the feature of the first image through an attention neural network;
generating a category score map of the first image based on the feature of the first image through a category scoring neural network;
generating a threshold attention map of the first image based on the attention map and the category score map;
determining at least one first sub-region of which the attention response intensity is sorted from strong to weak according to a sequence of attention response intensity of different regions in the threshold attention map; and
determining at least one region of the second image corresponding to the at least one first sub-region to be the at least one key sub-region.

2. The method according to claim 1, wherein the category detection result of the second image comprises at least one of the following: a category to which the second image belongs, or a probability that the second image belongs to a respective predetermined category.

3. The method according to claim 2, wherein the category detection result of the second image further comprises at least one of the following: the at least one key sub-region, or position information of the at least one key sub-region.

4. The method according to claim 1, wherein the generating a threshold attention map of the first image based on the attention map and the category score map comprises:
performing point multiplication on the attention map and the category score map to obtain the threshold attention map.

5. The method according to claim 1, wherein the generating a category detection result of the second image at least based on the extracted feature of the first image and feature of the at least one key sub-region comprises:
generating a first feature vector based on the feature of the first image;
generating a second feature vector based on the feature of the at least one key sub-region;
splicing the first feature vector and the second feature vector;
generating a second category score vector of the spliced content relative to the predetermined category based on the spliced feature vector, wherein the spliced content comprises the first image and the at least one key sub-region; and
generating a category detection result of the second image at least according to the second category score vector.

6. The method according to claim 5, wherein the generating a category detection result of the second image at least according to the second category score vector comprises:
generating a first category score vector of the first image relative to the predetermined category based on the first feature vector; and
generating a category detection result of the second image according to the first category score vector and the second category score vector.

7. The method according to claim 5, wherein the generating a category detection result of the second image according to the second category score vector comprises:
generating a third category score vector of the first image relative to the predetermined category based on the attention map; and
generating a category detection result of the second image according to the third category score vector and the second category score vector.

8. The method according to claim 7, wherein the generating a category detection result of the second image according to the third category score vector and the second category score vector comprises:
generating a first category score vector of the first image relative to the predetermined category based on the first feature vector; and
generating a category detection result of the second image according to the first category score vector, the second category score vector, and the third category score vector.

9. The method according to claim 5, wherein the generating a category detection result of the second image according to the second category score vector comprises:
generating a fourth category score vector of the first image relative to the predetermined category based on the threshold attention map; and
generating a category detection result of the second image according to the fourth category score vector and the second category score vector.

10. The method according to claim 9, wherein the generating a category detection result of the second image according to the fourth category score vector and the second category score vector comprises:
generating a first category score vector of the first image relative to the predetermined category based on the first feature vector; and
generating a category detection result of the second image according to the first category score vector, the second category score vector, and the fourth category score vector.

11. The method according to claim 1, wherein the first image is a first medical image, the second image is a second medical image, the category detection corresponds to predetermined disease level detection, and the category detection result is a disease diagnosis result.

12. The method according to claim 11, wherein the disease diagnosis result of the second medical image comprises at least one of the following: the disease level to which the second medical image belongs, a probability that the second medical image belongs to a respective predetermined disease level, the at least one key sub-region, or position information of the at least one key sub-region.

13. An apparatus for detecting image category, comprising:
   a processor; and
   a memory for storing instructions executable by the processor;
   wherein the processor is configured to:
   down-sample a second image to obtain a first image;
   determine at least one key sub-region in the second image for category detection;
   respectively extract a feature of the first image and a feature of the at least one key sub-region; and
   generate a category detection result of the second image at least based on the extracted feature of the first image and feature of the at least one key sub-region,
   wherein the processor is further configured to:
   generate an attention map of the first image based on the feature of the first image through an attention neural network;
   determine a region with the strongest attention response in the attention map to be a first sub-region; and
   determine a region of the second image corresponding to the first sub-region to be the key sub-region,
   or,
   wherein the processor is further configured to:
   generate an attention map of the first image based on the feature of the first image through an attention neural network;
   generate a category score map of the first image based on the feature of the first image through a category scoring neural network;
   generate a threshold attention map of the first image based on the attention map and the category score map;
   determine at least one first sub-region of which the attention response intensity is sorted from strong to weak according to a sequence of attention response intensity of different regions in the threshold attention map; and
   determine at least one region of the second image corresponding to the at least one first sub-region to be the at least one key sub-region.

14. The apparatus according to claim 13, wherein the category detection result of the second image comprises at least one of the following: a category to which the second image belongs, and a probability that the second image belongs to a respective predetermined category, the at least one key sub-region, or position information of the at least one key sub-region.

15. The apparatus according to claim 13, wherein the first image is a first medical image, the second image is a second medical image, the category detection corresponds to predetermined disease level detection, and the category detection result is a disease diagnosis result.

16. A non-transitory computer readable storage medium, for storing computer readable instructions, wherein the computer readable instructions, when being executed, causes a processor to perform:
   down-sampling a second image to obtain a first image;
   determining at least one key sub-region in the second image for category detection;
   respectively extracting a feature of the first image and a feature of the at least one key sub-region; and
   generating a category detection result of the second image at least based on the extracted feature of the first image and feature of the at least one key sub-region,
   wherein the operation of determining at least one key sub-region in the second image relative to category detection comprises:
   generating an attention map of the first image based on the feature of the first image through an attention neural network;
   determining a region with the strongest attention response in the attention map to be a first sub-region; and
   determining a region of the second image corresponding to the first sub-region to be the key sub-region,
   or,
   wherein the operation of determining at least one key sub-region in the second image relative to category detection comprises:
   generating an attention map of the first image based on the feature of the first image through an attention neural network;
   generating a category score map of the first image based on the feature of the first image through a category scoring neural network;
   generating a threshold attention map of the first image based on the attention map and the category score map;
   determining at least one first sub-region of which the attention response intensity is sorted from strong to weak according to a sequence of attention response intensity of different regions in the threshold attention map; and
   determining at least one region of the second image corresponding to the at least one first sub-region to be the at least one key sub-region.

17. The non-transitory computer readable storage medium according to claim 16, wherein the first image is a first medical image, the second image is a second medical image, the category detection corresponds to predetermined disease level detection, and the category detection result is a disease diagnosis result.

18. The apparatus according to claim 13, wherein the processor is further configured to:
   perform point multiplication on the attention map and the category score map to obtain the threshold attention map.

19. The apparatus according to claim 13, wherein the processor is further configured to:
   generate a first feature vector based on the feature of the first image;
   generate a second feature vector based on the feature of the at least one key sub-region;
   splice the first feature vector and the second feature vector;
   generate a second category score vector of the spliced content relative to the predetermined category based on the spliced feature vector, wherein the spliced content comprises the first image and the at least one key sub-region; and generate a category detection result of the second image at least according to the second category score vector.

\* \* \* \* \*